(12) United States Patent
Rogenmoser et al.

(10) Patent No.: US 11,526,156 B2
(45) Date of Patent: Dec. 13, 2022

(54) COMPUTER-IMPLEMENTED METHOD FOR THE MONITORING OF A PLURALITY OF CABLE-PROCESSING MACHINES, AND A MONITORING SYSTEM

(71) Applicant: Komax Holding AG, Dierikon (CH)

(72) Inventors: Daniel Rogenmoser, Ballwil (CH); Dierk Brunner, Steinen (CH); Daniel Emmenegger, Kastanienbaum (CH)

(73) Assignee: KOMAX HOLDING AG, Dierikon (CH)

( * ) Notice: Subject to any disclaimer, the term of this patent is extended or adjusted under 35 U.S.C. 154(b) by 0 days.

(21) Appl. No.: 16/796,980

(22) Filed: Feb. 21, 2020

(65) Prior Publication Data
US 2020/0285222 A1 Sep. 10, 2020

(30) Foreign Application Priority Data
Mar. 6, 2019 (EP) .................................... 19160945

(51) Int. Cl.
*G05B 19/418* (2006.01)
*G06F 16/17* (2019.01)

(52) U.S. Cl.
CPC ..... *G05B 19/4184* (2013.01); *G05B 19/4183* (2013.01); *G05B 19/4185* (2013.01); *G05B 19/41865* (2013.01); *G05B 19/41875* (2013.01); *G06F 16/1734* (2019.01)

(58) Field of Classification Search
CPC ............ G05B 19/4184; G05B 19/4183; G05B 19/4185; G05B 19/41865; G05B 19/41875; G05B 2219/49305; G06F 16/1734; Y02P 90/80
See application file for complete search history.

(56) References Cited

U.S. PATENT DOCUMENTS

| | | | |
|---|---|---|---|
| 2010/0023156 A1* | 1/2010 | Trepina ................. | G05B 19/406 700/175 |
| 2010/0211429 A1* | 8/2010 | Benson ................... | G06Q 50/08 700/174 |
| 2010/0293493 A1 | 11/2010 | Khazanov et al. | |
| 2014/0047064 A1* | 2/2014 | Maturana .............. | H04L 67/125 709/217 |
| 2016/0094000 A1* | 3/2016 | Deck ..................... | H01R 43/048 29/753 |
| 2020/0201309 A1* | 6/2020 | Maruyama ............. | G06N 20/00 |

FOREIGN PATENT DOCUMENTS

| | | |
|---|---|---|
| EP | 1557846 A1 | 7/2005 |
| GB | 2283835 A | 5/1995 |
| JP | 2016213158 A | 12/2016 |
| JP | 2018007158 A * | 1/2018 |

* cited by examiner

*Primary Examiner* — Christopher E. Everett
(74) *Attorney, Agent, or Firm* — William J. Clemens; Shumaker, Loop & Kendrick, LLP

(57) ABSTRACT

A computer-implemented method for the monitoring of a plurality of cable-processing machines for the processing of cables includes the following steps: transmission of production parameters from one cable-processing machine, or a plurality of cable-processing machines, to a control server with a central database, wherein the production parameters include settings for the cable-processing machine for the processing of the cables by the cable-processing machine in question; reception of the production parameters by the control server; and storage of the production parameters in the central database.

20 Claims, 1 Drawing Sheet

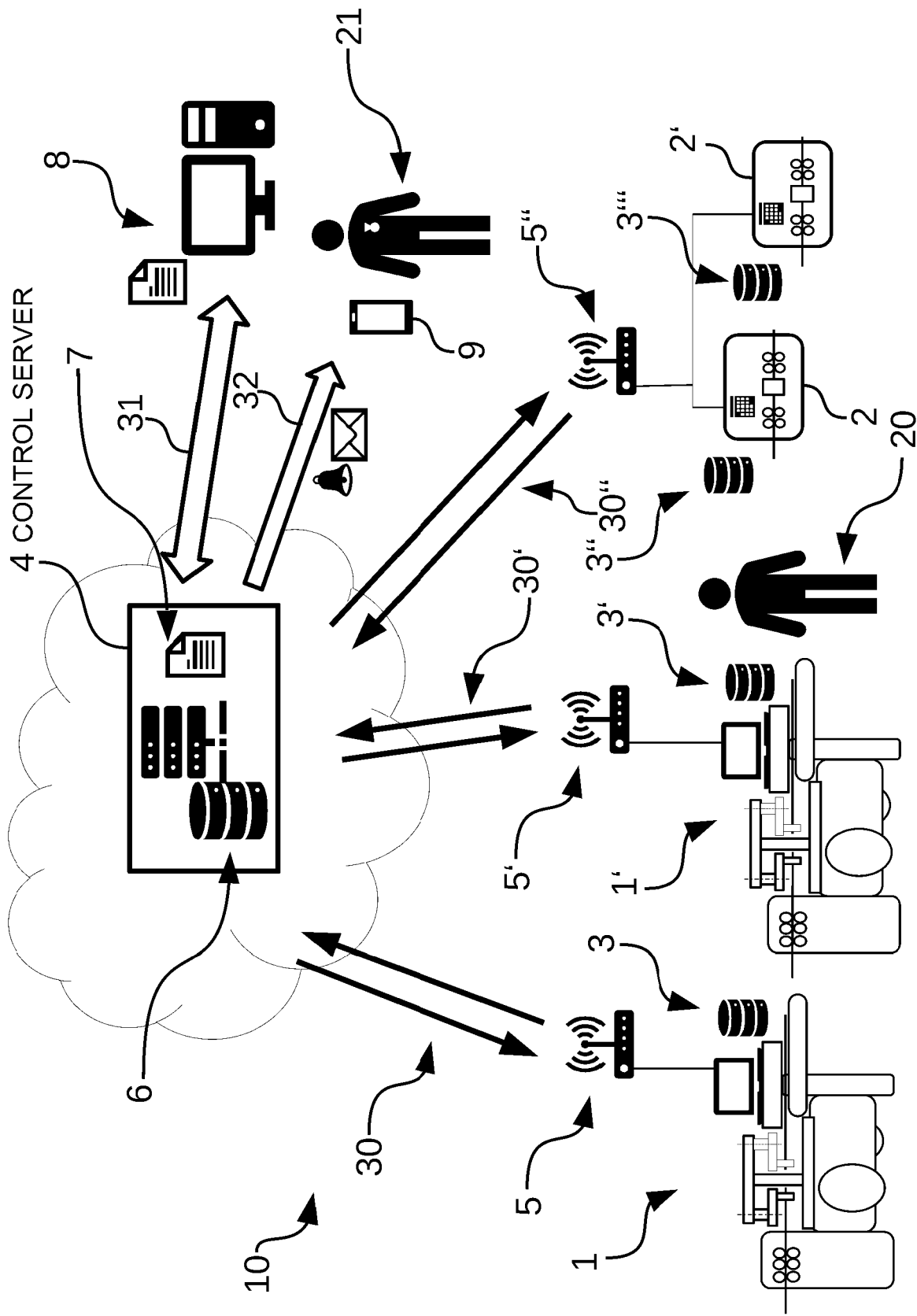

COMPUTER-IMPLEMENTED METHOD FOR THE MONITORING OF A PLURALITY OF CABLE-PROCESSING MACHINES, AND A MONITORING SYSTEM

FIELD

The present invention concerns a computer-implemented method for the monitoring of a plurality of cable-processing machines, and a monitoring system.

BACKGROUND

A large number of cable-processing machines are often deployed in a company. These are often of the same type and are used to process the same spectrum of production material, which usually comprises:
- cable, characterized by the cable type (number of strands, the conductor cross-section, the outer diameter and the color of the insulation), the length of the cable and the length of the stripped insulation at the two cable ends and, if appropriate, special processing of the stripped cable ends such as twisting, tinning or compaction.
- contact parts (crimped contacts or cable end ferrules) on one or both cable ends, characterized by their type and position relative to the cable end.
- sealing grommets, characterized by their type and position relative to the cable end.

The finished cable, that is to say, the article to be produced, is determined by the combination and connection of the production material with the desired features, for example a cable of a certain type, which is cut to the desired length, stripped of insulation on both sides over a certain length, and provided with certain sealing grommets and contact parts, in each case at the desired positions. Usually, a plurality of batches of the same article is produced as a production order on a cable-processing machine, and the cable-processing machine is then modified and set up for another article.

Not all types of cable-processing machines can process the same articles. Thus, simpler cable-processing machines can only cut cable to length and strip off the insulation, and certain types cannot fit sealing grommets.

To set up an article, the production material and the article definition must be available in the local database of the cable-processing machine. This can be done "manually" by the user, or these data are provided by a master computer and transferred to the cable-processing machine.

In addition to the data that determine the article to be produced, production parameters must also be defined on the cable-processing machine; these can vary depending on the type of cable-processing machine. For example, these take the form of:
- cable feed speed and acceleration
- cutting depth of the knives during the stripping of the insulation
- (swiveling) speeds when approaching the processing stations
- process settings on the process modules (crimping presses and sealing modules)
- parameters for the setting up of the quality monitors The correct setting of the production parameters has a strong influence on the output rate of the cable-processing machine, and the quality of the articles produced by the cable-processing machine in question.

While the article definitions and the data for the production orders (article, quantity, and batch size) can be centrally managed and distributed by a master computer, that is to say, by production control software, the operator or user typically finds and sets up the optimum production parameters locally on the cable-processing machine. This can be done as an iterative process during production, for example by increasing the speeds up to the value at which the production quality decreases to an inadmissible extent. Since the production parameters are set up locally, there is a risk that not all cable-processing machines are set up optimally, and that this will result in different output rates and production qualities for each cable-processing machine producing the same article.

A worn, poorly set up, or poorly maintained cable-processing machine, or a cable-processing machine that is not adjusted correctly mechanically, can often, in unfavorable circumstances, stop in the course of operation with a fault message and can thus have poor availability. Since the fault messages are acknowledged locally on the individual cable-processing machine, it is not easy to determine which cable-processing machines in a factory are particularly often affected by downtimes.

There can be a need, inter alia, for a computer-implemented process or monitoring system to remedy the deficiencies described above, and to make it easy from a technical point of view to monitor the cable-processing machines.

SUMMARY

According to a first aspect of the invention, a computer-implemented method for the monitoring of a plurality of cable-processing machines for the processing of cables is proposed, wherein the method comprises the following steps: transmission of production parameters from one cable-processing machine or a plurality of cable-processing machines to a control server with a central database, wherein the production parameters comprise settings of the cable-processing machine for the processing of the cables by the cable-processing machine in question; and reception of the production parameters by the control server; and storage of the production parameters in the central data-base.

The advantage here is that the production parameters can typically be accessed centrally and these can be compared with one another. In addition, the production parameters can usually be analyzed quickly and easily from a technical point of view. Typically, relationships between the production parameters and other properties (e.g. how many cables are processed by the cable-processing machine in question in a given period of time), or settings of the cable-processing machine or machines in question, can also be determined easily from a technical point of view. It is also in general possible hereby to gain a quick overview of the production data of the cable-processing machines. This increases the efficiency of the operation of the cable-processing machines.

According to a second aspect of the invention, a monitoring system for the monitoring of a plurality of cable-processing machines is proposed, wherein the monitoring system comprises the following: a plurality of cable-processing machines for the processing of cables, and a control server for the control and monitoring of the cable-processing machines, wherein the control server comprises a central database, wherein the cable-processing machines are designed to transmit production parameters to the control server, wherein the production parameters comprise settings of the cable-processing machine for the processing of the cables by the cable-processing machine in question, wherein the control server is designed to receive the production parameters and to store the production parameters in the central database.

The advantage of this monitoring system is that it is usually easy from a technical point of view to access the production parameters centrally, and to compare them with one another. Furthermore, with this monitoring system it is usually possible to analyze and evaluate statistically the production parameters quickly and easily from a technical point of view. By means of the monitoring system and the central recording of the production parameters, correlations between the production parameters and other properties (e.g. how many cables are processed by the cable-processing machine in question in a given period of time), or settings of the cable-processing machine in question, can typically be determined easily from a technical point of view. In addition, the central recording of the production parameters in the monitoring system usually provides a simple and quick overview from a technical point of view of the production data of the cable-processing machines. This usually increases the efficiency of the operation of the cable-processing machines.

A computer program product is also proposed, which has instructions readable by a processor of a computer, which, when executed by the processor, cause the processor to execute the above-cited method. In addition, a computer-readable medium is proposed, on which this computer program product is stored.

Possible features and advantages of forms of embodiment of the invention can, inter alia, and without limiting the invention, be considered to be based on the ideas and findings described below.

In accordance with one form of embodiment of the method, the method also comprises the following steps: transmission of fault messages from one or a plurality of the cable-processing machines to the control server; reception of the fault messages by the control server; and storage of the fault messages in the central database.

In other words, fault messages can additionally be stored centrally.

The advantage here is that, in general, the central storage of fault messages makes it easy from a technical point of view to determine whether and which cable-processing machine has more faults, or more similar faults, than other cable-processing machines. In addition, correlations between the set production parameters and the fault messages can typically be easily established or recognized from a technical point of view. This means that the cable-processing machines can usually be operated particularly efficiently. This usually increases the maximum number of cables to be processed per time unit, and the average quality of the processed cables. Typically, production parameters or settings of the cable-processing machine that lead to a particularly low number of fault messages can also be determined or identified, such that these can be set up on other cable-processing machines.

In accordance with one form of embodiment of the method, the method also comprises the following steps: transmission of production data from the control server to a cable-processing machine or a plurality of cable-processing machines, wherein the production data comprise the type of cable to be processed and/or the number of cables to be processed, in particular also the batch size; storage of the transmitted production data in the central database; and reception and processing of the production data by the cable-processing machine in question.

In other words, the production data, in particular which cable, or which type of cable, is to be processed and how the cable is to be processed, e.g. with which components (crimped contact etc.) the cable is to be connected, how many cables are to be processed accordingly (quantity and/or batch size), can be distributed centrally to the cable-processing machines and stored centrally.

The advantage here is that the control server can typically distribute or transmit the production data to the cable-processing machines easily from a technical point of view. Thus, a master computer can in general be dispensed with. In addition, the production data can usually be centrally recorded, analyzed and examined in connection with production parameters and/or fault messages.

In accordance with one form of embodiment of the method, the method also comprises the following steps: transmission of production data from a cable-processing machine to the control server, wherein the production data comprises the type of cable to be processed and/or the number of cables to be processed, in particular also the batch size; reception of the production data by the control server; and storage of the production data received from the control server in the central database.

In other words, production data can be transmitted from the cable-processing machine to the control server and stored centrally.

The advantage here is that, in particular if no master computer is available, the production data can be entered or recorded on a cable-processing machine, or by means of a cable-processing machine, and then transmitted to the production server. From the production server, the data can then in general be transmitted or distributed to the other cable-processing machines. This means that the production data from one cable-processing machine can typically be transferred or replicated easily from a technical pint of view onto the other cable-processing machines. In addition, the input of production data on the cable-processing machine is in general particularly simple from a technical point of view, can be executed quickly, and is particularly convenient for the user. After a successfully executed test on one cable-processing machine, the production data can also be transferred to the other cable-processing machines easily from a technical point of view.

In accordance with one form of embodiment of the method, the method also comprises the following steps: transmission of quality data and/or quality parameters from one or a plurality of cable-processing machines to the control server, wherein the quality data comprises information about the quality of the processed cables, and/or the quality parameters comprise settings for determining the quality of the processed cables; and reception of the quality data and/or quality parameters by the control server, and storage of the quality data and/or quality parameters in the central database.

In other words, quality data about the processed cable can hereby be centrally recorded and stored.

The advantage here is that the qualities of the processing by the different cable-processing machines can typically be compared with one another easily from a technical point of view. In addition, relationships between quality, fault messages, production data and production parameters can usually be analyzed or recognized. Thus, for example, it can in general be stated that the difference in one aspect of the production parameters of a cable-processing machine compared to other cable-processing machines leads to a below-average quality of the processed cable. The quality data can typically include data on the type of quality measurement(s) executed.

In accordance with one form of embodiment of the method, the method also comprises the following steps: transmission of log-on data and/or log-off data of users on the cable-processing machine in question from one cable-processing machine or a plurality of cable-processing machines to the control server, wherein in particular the log-on data and/or log-off data comprise times of the log-on and/or log-off of users on the cable-processing machine in question; and storage of the log-on data and/or log-off data in the central database.

In other words, the log-ons and log-offs of users can be centrally logged on the individual cable-processing machines.

The advantage here is that it is usually possible to determine who logged on to, or logged off from, which cable-processing machine and when. This can in general be used, for example, when comparing working data or working times of employees, to determine whether passwords have been illegally passed on between users. For example, if a user was logged on although he was not on duty, it can be recognized that the log-on data of this user was used by another user. It is also conceivable for every input or modification of parameters and/or data executed by the user to be logged and stored. This can be executed in a revision-proof manner. This can typically determine who has executed a change, and this user can be asked why and for what reason he made certain alterations to production parameters, quality parameters and/or production data.

In accordance with one form of embodiment of the method, the method also comprises the following step: transmission of a fault message and/or a warning message, in particular one based on the fault message, from the control server to a monitoring computer, and/or to a terminal device of a user of the cable-processing machine, in particular a user with special rights on the cable-processing machine in question.

In other words, a user of the cable-processing machine can be actively informed (push message) of a fault message.

The advantage here is that the user can in general be informed of a fault message even if he is not in the vicinity of the cable-processing machine. This typically reduces the time until the fault is acknowledged and corrected. This usually increases the efficiency of the operation of the cable-processing machines. The user can have special rights to the cable-processing machine or machines, i.e. more, or more extensive, rights than at least one other individual user of the cable-processing machine. For example, the special rights can include rights to acknowledge certain fault messages, and/or rights to alter certain production parameters and/or quality parameters or the like. The user with special rights "may undertake", so to speak, more than another user. Rules as to when a fault message and/or a warning message are transmitted can be set up by the user. For example, a fault message and/or a warning message can be transmitted if an unauthorized user logs on or attempts to log on, if above-average or conspicuously long downtimes (e.g. at least 10% above the average of the last 24 hours, the last week or the last month) of the cable-processing machines are recognized, and/or a multiple occurrence of a particular fault is recognized on a cable-processing machine, or on various cable-processing machines.

In accordance with one form of embodiment of the method, the cable-processing machines comprise different types of cable-processing machines, wherein the cable-processing machines of the same type are assembled into a group, wherein the control server transmits the same data and/or parameters to the cable-processing machines of the group in question.

In other words, groups of similar cable-processing machines can hereby be formed.

The advantage here is that the monitoring and/or control of the cable-processing machines is in general particularly easy from a technical point of view. In addition, the control server can typically be particularly simple from a technical point of view. Each group can be connected to the control server via a common interface. By this means costs and effort are saved.

In accordance with one form of embodiment of the method, the cable-processing machines each have a local database, wherein data and/or parameters are exchanged between the cable-processing machines and the control server, such that the central database has a copy of each of the local databases of the cable-processing machines.

In other words, the central database comprises copies of the cable-processing machine databases, i.e. all the data in the respective databases.

The advantage here is that the control server or a user can usually access and analyze all data easily from a technical point of view. In addition, a backup of the local data-bases usually exists in this way, as a result of which the risk of data loss is reduced.

In accordance with one form of embodiment of the method, the method also comprises the following steps: transmission of cable-processing start times and/or cable-processing end times of production batches of the cable-processing machine in question to the control server; reception of the cable-processing start times and/or cable-processing end times by the control server; and storage of the cable-processing start times and/or cable-processing end times in the central database.

In other words, by this means the start and/or end times of production batches can be centrally recorded and stored.

One advantage here is that efficiency analyses of the individual cable-processing machines can in general be executed easily from a technical point of view. It is also possible to identify cable-processing machines that have taken significantly longer or shorter than the average to process the same number of cables in the same way.

In accordance with one form of embodiment of the method, the method also comprises the following steps: transmission of production parameters from the control server to the one cable-processing machine, or to a plurality of cable-processing machines; reception and adoption of the production parameters by the cable-processing machine or machines; and storage of the transmitted production parameters in the central database.

In other words, by this means production parameters of the cable-processing machines can be altered centrally by the control server.

The advantage here is that the production parameters can typically be altered easily from a technical point of view, without having to be in the vicinity of the cable-processing machine in question. As a result, production parameters that have been identified as efficient can usually be transferred easily from a technical point of view from the control server to the cable-processing machines, such that the latter adopt the production parameters.

In accordance with one form of embodiment of the method, the method also comprises the following step: provision of a web service, wherein the web service is designed for the: representation of groups of cable-processing machines and/or definition of groups of cable-processing machines, management of users of the cable-processing machines, in particular with the respective user level, representation and/or alteration of the production data of the cable-processing machines and/or distributing article definitions from the control server to the cable-processing machines, definition and storage of rules for the representation, comparison, filtering and/or synchronization of the data available in the central database, statistical evaluation of the production data, production parameters, further data and/or fault messages of the central database, and/or definition of events and/or data deviations, which generate a fault message and/or a warning message.

In other words, a service accessible via a network, in particular a local network or the Internet, that is to say, the world wide web, can be provided, by means of which various functionalities of the monitoring system or the cable-processing machines can be used, and/or information about the cable-processing machines can be altered and/or displayed.

The advantage here is that a user typically does not have to be physically on site in order to use the various functions of the monitoring system or the cable-processing machines, and/or in order to make alterations to the cable-processing machines. The user can also do this remotely, that is to say, by remote maintenance. This reduces the costs and increases the variability and flexibility of the cable-processing machines. In particular, if a fault message or a problem occurs, the user can quickly resolve the fault or problem remotely, even if he is not on-site. In general, statistical evaluations, fault analyses etc. can also be executed remotely.

In accordance with one form of embodiment of the monitoring system, the cable-processing machines are designed to send fault messages to the control server, wherein the control server is designed to receive the fault messages and to store the fault messages in the central database.

In other words, fault messages can additionally be stored centrally in the monitoring system.

A further advantage here is that fault messages from the cable-processing machine can typically be stored centrally. Thus, the central database can usually be used to determine, easily from a technical point of view, whether and which cable-processing machine has more faults, or more similar faults, than other cable-processing machines. Another advantage of the monitoring system is that, as a rule, correlations or dependencies between the set production parameters and the fault messages of the cable-processing machines can be analyzed or determined easily from a technical point of view. As a result, the cable-processing machines can usually be operated very efficiently. By this means the maximum number of cables to be processed per unit of time can typically be increased, as can the average quality of the processed cables in the monitoring system. A further advantage of the monitoring system is that production parameters or settings of the cable-processing machine, which lead to a particularly low number of fault messages, can in general be determined or identified easily from a technical point of view, such that they can be set up on other cable-processing machines.

According to one form of embodiment of the monitoring system, the cable-processing machines are adapted to send quality data and/or quality parameters to the control server, wherein the quality data comprises information about the quality of the processed cables, and/or wherein the quality parameters comprise settings for determining the quality of the processed cables, and wherein the control server is designed to receive the quality data and/or quality parameters, and to store the quality data and/or quality parameters in the central database.

In other words, quality data and/or quality parameters from the cable-processing machines can be transmitted to the control server and stored in the central database.

One advantage here is that the quality of the processing operations executed by the different cable-processing machines can be compared and analyzed easily from a technical point of view by the control server. In addition, relationships or correlations between quality, fault messages, production data and production parameters can be analyzed and recognized. Consequently, it can usually be seen, for example, that the difference in one aspect of the production parameters of one cable-processing machine in comparison to other cable-processing machines results in a below-average quality of the processed cables. The quality data can typically include data concerning the type of quality measurement(s) executed. By means of the control server it can also be determined easily from a technical point of view as to how the quality of the cable-processing machine in question has been determined.

According to one form of embodiment of the monitoring system, the cable-processing machines each have a local database, and wherein the central database has a copy of each of the local databases of the cable-processing machines.

In other words, a copy of each local database can be found in the central database.

One advantage here is that the control server, or a user of the monitoring system, can in general access and analyze all the data in the database easily from a technical point of view. In addition, there exists in general a backup of the local database in question, as a result of which the risk of data loss is minimized.

In accordance with one form of embodiment of the monitoring system, the monitoring system also has stationary and/or mobile terminal devices, wherein the control server is designed to transmit fault messages and/or statistics concerning the quality data to the terminal devices.

In other words, fault messages and/or statistics can be transmitted actively ("push message") to terminal devices.

One advantage here is that the user can typically be informed quickly and easily from a technical point of view by means of the terminal device, even if the user is not in the vicinity of the cable-processing machine in question. By the transmission of the fault messages and/or statistics, the user can react within a short time and thus reduce the time until the fault message is acknowledged and the fault is corrected. This usually increases the efficiency of the operation of the cable-processing machines. The user of the terminal device in question can have special rights on the cable-processing machine or machines, i.e. more, or more extensive, rights than at least one other individual user of the cable-processing machine. It is possible for the user to have extensive rights to acknowledge certain fault messages and/or rights to alter certain production parameters and/or quality parameters or similar on the cable-processing machine or machines. In a manner of speaking, the user with special rights on the cable-processing machines "may undertake", so to speak, more than another user, or a normal user.

In accordance with one form of embodiment of the monitoring system, the monitoring system is designed to provide a web service, wherein the web service is for:
—representation of groups of cable-processing machines and/or definition of groups of cable-processing machines, —management of users of the cable-processing machines, in particular with the respective user level, —representation and/or alteration of the production data of the cable-processing machines, and/or distribution of article definitions from the control server to the cable-processing machines, —representation and/or comparison of the production parameters of a specific group of cable-processing machines, —definition and storage of rules for the representation, comparison, filtering and/or synchronization of data in the central database, —statistical evaluation of production data, production parameters, other data and/or fault messages from the central database, and/or—definition of events and/or data deviations that are designed to generate a fault message and/or a warning message.

In other words, the monitoring system can offer a service that is accessible via a network, in particular a local network, or the Internet, that is to say, the world wide web, by means of which various functionalities of the monitoring system or the cable-processing machines can be used, and/or information about the cable-processing machines can be altered and/or displayed.

One advantage here is that in general a user does not have to be on site and can nevertheless use various functionalities or functions of the monitoring system or the cable-processing machines. In addition, the user can record and/or alter settings on the cable-processing machine remotely. By this means the operating costs can be reduced, as can the length or number of operational interruptions of the cable-processing machines. If, for example, a fault message occurs, the user can be informed, and/or measures can be taken automatically according to defined rules. The user can make alterations or correct the fault remotely. In addition, statistical evaluations, fault analyses etc. can be executed remotely.

The production parameters can include, for example, the speed and acceleration of the cable feed, the cutting depth of the knives during the stripping of the insulation, (swiveling) speeds during the start-up of the processing stations, process settings on the process modules (crimping presses and sealing modules), and/or parameters for setting up the quality monitors.

It should be noted that some of the possible features and benefits of the invention are described herein with reference to various forms of embodiment. A person skilled in the art recognizes that the features can be suitably combined, adapted or exchanged in order to arrive at further forms of embodiment of the invention.

In what follows, forms of embodiment of the invention are described with reference to the accompanying drawing, wherein neither the drawing nor the description are to be interpreted as restricting the invention.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 shows a schematic representation of one form of embodiment of the inventive monitoring system.

The FIGURE is only schematic and not true to scale.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 shows a schematic representation of one form of embodiment of the inventive monitoring system 10.

The monitoring system 10 (which can also be a control/monitoring system) comprises a control server 4 with a central database 6 and a plurality of cable-processing machines 1, 1', 2, 2'. In particular the central database 6 is to be understood to be a database 6 that is not only available locally on the cable-processing machines in question 1, 1', 2, 2', but which can be accessed centrally, e.g. from the control server 4. The central database 6 can, of course, be distributed and/or mirrored over a plurality of locations.

FIG. 1 shows four cable-processing machines 1, 1', 2, 2': two cable-processing machines 1, 1' of a first technically more complex type on the left-hand side in FIG. 1, and two cable-processing machines 2, 2' of a second technically simpler type on the right-hand side in FIG. 1. The cable-processing machines 1, 1', 2, 2' of the same type can in each case be assembled into a group. The control server 4 can address the groups, and/or exchange data with the latter, or can address the individual cable-processing machines 1, 1', 2, 2', and/or exchange data with the latter.

The cable-processing machines 1, 1', 2, 2' each have a local database 3, 3', 3", 3"'. Fault messages, quality data, production data, and/or production parameters are stored in the local database 3, 3', 3", 3"'.

The cable-processing machines 1, 1', 2, 2' are in each case connected to the control server 4 by way of a switching device 5, 5', 5" (gateway) or interface. It is possible for a plurality of cable-processing machines 1, 1', 2, 2', or each group of cable-processing machines 1, 1', 2, 2', to share a switching device 5, 5', 5".

The switching devices 5, 5', 5" are wirelessly connected to the control server 4. The connection can be made via a local network, via mobile communications, and/or via the Internet.

Bi-directional communication 30, 30', 30" can take place between the switching devices 5, 5', 5" and the control server 4.

The control server 4 can be a cloud solution over the Internet, or a component of a local network. The control server 4 can, for example, comprise a computer and the central database 6. The control server 4 runs software 7 with a plurality of software modules.

For example, a first software module can be designed for communication 31 with the cable-processing machines 1, 1', 2, 2'. The first software module can use a defined transmission protocol (e.g. TCP/IP) to transmit and/or receive data (e.g. quality data and/or production data), parameters (e.g. production parameters and/or quality parameters), and fault messages.

A second software module can be designed to store the data, parameters and fault messages in the central database 6. The database 6 can have a functional data structure, e.g. it can be a relational database 6.

A third software module can provide a web service. It is also possible for the third software module, for the transmission of fault messages and/or warning messages or other information, to be designed as a push message 32 or an active message to a stationary terminal device 8 (e.g. a desktop computer), and/or to mobile terminal devices 9 (e.g. a mobile phone, smart phone, tablet, laptop). The web service can enable authorized users 20, 21 to communicate with the control server 4 via a user interface integrated in the corresponding web client. The web client can be operated on the stationary terminal device 8 and/or on the mobile terminal devices 9. Bi-directional communication can take place between the stationary terminal device 8 and the control server 4. The web client offers, for example, the following functions via its user interface:

- representation of the configurations of the cable-processing machines 1, 1', 2, 2', and definition of the groups of cable-processing machines 1, 1', 2, 2'. These can be used for the comparison and synchronization or alteration of the production parameters of the cable-processing machines 1, 1', 2, 2';
- management of the users 20, 21 of the cable-processing machines 1, 1', 2, 2' with the respective user level;
- representation of production data and distribution of article definitions. By this means these data can also be distributed, if no master computer or higher-level software is available for production control;
- representation and comparison of the production parameters of a specific group of cable-processing machines 1, 1', 2, 2'. By this means non-optimally adjusted cable-processing machines 1, 1', 2, 2' can be recognized, and/or optimal production parameters can be determined or found;
- definition and storage of rules for the representation, comparison, filtering and/or synchronization of data available in the central database 6. By this means recurring tasks can be automated, or recurring tasks can be executed by running an appropriate script when certain conditions are fulfilled;
- statistical evaluations of the data, parameters and/or fault messages of the central database 6. By this means, for example, appropriate statistics for predictive maintenance or the planning of improvement measures in the organizational area can be compiled;

and/or

- definition of events and deviations of production parameters that generate an automatic message. If production parameters fall below or exceed specified limiting values or if deviations from specified average values exceed a specified limiting value, fault messages and/or warning messages can be generated automatically and transmitted to the terminal devices 8, 9. The fault messages and/or warning messages can be transmitted in the form of an e-mail, SMS, fax, instant message or similar.

The defined rules can also serve the purpose of the automatic distribution or transference of data and/or parameters to the cable-processing machines 1, 1', 2, 2'. Thus, for example, article definitions can be easily transferred to a plurality of cable-processing machines 1, 1', 2, 2', or to all cable-processing machines 1, 1', 2, 2', since the cable-processing machines 1, 1', 2, 2' and the production material have unique identifiers.

The defined rules, the filters applied, and/or the queries executed, are stored in the central database 6. This allows the existing data in the database 6 to be used particularly efficiently. It is also conceivable that a plurality of control servers 4, which in each case monitor and/or control a plurality of cable-processing machines 1, 1', 2, 2', are networked or connected to one another. These can be at one or a plurality of locations.

The cable-processing machines 1, 1', 2, 2' can, for example, process the following production materials:

- cable, characterized by the cable type (number of strands, conductor cross-section, outer diameter and color of the insulation), the length of the cable and the length of the stripped insulation at the two cable ends and, if appropriate, special processing of the stripped cable ends such as twisting, tinning or compaction,
- contact parts (crimped contacts or cable end ferrules) on one or both cable ends, characterized by their type and position relative to the cable end, and/or
- sealing grommets, characterized by their type and position relative to the cable end.

The production data can include, for example, a definition of the articles to be processed and their components, and/or production orders with quantities and/or batch sizes. The production data are transmitted from the control server 4 to the cable-processing machine 1, 1', 2, 2', the group of cable-processing machines 1, 1', 2, 2' or the cable-processing machines 1, 1', 2, 2', and are received and processed by the latter. It is also possible for the production data to be transmitted from the cable-processing machine 1, 1', 2, 2' to the control server 4 and stored by the control server 4. The control server 4 can store the received production data in the central database 6, and/or can transfer or send the production data to other cable-processing machines 1, 1', 2, 2'.

The production parameters are typically set up on the machine such that the articles can be produced particularly efficiently. The production parameters can be transmitted from the cable-processing machines 1, 1', 2, 2' to the control server 4, received by the control server 4, and stored in the central database 6.

Quality data and/or quality parameters can comprise data for the setting up of quality monitoring devices, and/or results of quality monitoring or quality measurements executed. Typical quality monitoring devices include cutting edge monitoring and optical monitoring of the stripping of insulation, crimp force monitoring of the crimping of the contact parts, and/or optical monitoring of the correct position of the sealing grommets. The quality data and/or quality parameters are transmitted from the cable-processing machine 1, 1', 2, 2', the group of cable-processing machines 1, 1', 2, 2' or the cable-processing machines 1, 1', 2, 2' to the control server 4. It is also possible for quality parameters to be transmitted from the control server 4 to the cable-processing machine 1, 1', 2, 2', the group of cable-processing machines 1, 1', 2, 2' or the cable-processing machines 1, 1', 2, 2', and to be adopted by the cable-processing machine 1, 1', 2, 2', or the cable-processing machines 1, 1', 2, 2'. In this manner, the settings or parameters for the checking of the processed cable can be altered centrally, easily from a technical point of view, on the cable-processing machines 1, 1', 2, 2'.

The central database 6 can contain a copy or an image (digital twin) of the local databases 3, 3', 3", 3'" that are available on the cable-processing machines in question 1, 1', 2, 2'. For this purpose, the data can be exchanged with one another between the control server 4 and the cable-processing machines 1, 1', 2, 2' such that, at least after an executed synchronization of the databases 3, 3', 3", 3'", 6, the central database 6 in each case comprises a current copy of the respective local database 3, 3', 3", 3'", and such that the local databases 3, 3', 3", 3'" in each case correspond to the copy in the central database 6. Synchronization can be executed at fixed intervals (e.g. every 5 minutes, every 30 minutes, every hour) and/or when updating the database.

The fault messages can be transmitted from the cable-processing machines 1, 1', 2, 2' to the control server 4, received by the control server 4, and stored in the central database 6.

The central database 6 stores the data, parameters and fault messages of the cable-processing machines 1, 1', 2, 2' with a corresponding assignment to the cable-processing machine in question 1, 1', 2, 2', such that the data, parameters and fault messages can each be uniquely assigned to a cable-processing machine 1, 1', 2, 2' or to a group of cable-processing machines 1, 1', 2, 2'. In addition, it is possible for the central database to store 6 other events. The other events are transmitted from the cable-processing machines in question 1, 1', 2, 2' to the control server 4, or from the control server 4 to the cable-processing machines 1, 1', 2, 2'. The other events can comprise, amongst others, the following:

- log-ins and log-outs of the machine operators with the associated user levels and/or with the associated times (log-in data and log-out data),
- start and end times and quantities of production orders and batches,
- fault messages and other interruptions in production or the operation of the cable-processing machines 1, 1', 2, 2', and/or
- detection and reporting of poorly produced cables and/or results of quality monitoring.

The users 20, 21 can have various (access/alteration) rights to the cable-processing machine in question 1, 1', 2, 2'. For example, there can be users 20 with simple rights. These can only access predefined cable-processing machines 1, 1', 2, 2', and/or can only make simple alterations to the production parameters, and/or can only acknowledge fault messages with a low intervention intensity. The access rights of the machine operators or users can be restricted so as to prevent, for example, insufficiently qualified operators or users from adjusting the production parameters. If this is nevertheless done, for example as a result of an unauthorized disclosure of the appropriate passwords, this can also lead to poorly set up cable-processing machines.

In addition, there can be users 21 with special or extended (access/alteration) rights, e.g. a shift leader. The latter can access all the cable-processing machines 1, 1', 2, 2', and can alter (almost) all parameters and/or data.

If a fault message occurs on one of the cable-processing machines 1, 1', 2, 2', it is transmitted to the control server 4, received by the latter, and stored in the central database 6. Depending on the urgency, the control server 4 can transmit a fault message and/or a warning message based on the fault message to a stationary terminal device 8 and/or a mobile terminal device 9. The mobile device 9 can, for example, be carried by the user 21 with extended rights, such that he is quickly informed of the fault message, regardless of his location.

The cable-processing machines 1, 1', 2, 2' can send cable-processing start times and/or cable-processing end times of production batches of the cable-processing machine in question 1, 1', 2, 2' to the control server 4. By this means it can be determined as to how long the cable-processing machine has required 1, 1', 2, 2' to process the cable in question.

For example, if it is found that a cable-processing machine 1, 1', 2, 2' requires longer than the average time (calculated from the other cable-processing machines 1, 1', 2, 2') to process a particular type of cable, an appropriate warning message can be transmitted. By this means the corresponding cable-processing machine 1, 1', 2, 2' or the settings or parameters of the corresponding cable-processing machine 1, 1', 2, 2' can be examined so as to find out why this cable-processing machine 1, 1', 2, 2' is operating more slowly than the other cable-processing machines 1, 1', 2, 2'. Deviations within a tolerance interval around the average value can be tolerated. If, for example, the deviation is more than approx. 15%, or more than approx. 20%, it can be determined that this cable-processing machine 1, 1', 2, 2' has a problem, such that it can be investigated in more detail as to what is the cause.

The control server 4 can be a virtual server or a dedicated server.

The cable-processing machine 1, 1', 2, 2' can be, for example, a crimping machine with a punch and anvil, wherein one end or both ends of the cable is crimped with a crimped contact. It is also possible for the cable-processing machines 1, 1', 2, 2' to have a plurality of work stations in which the cables are processed in a variety of ways.

Finally, it should be noted that terms such as "having", "comprising", etc. do not exclude other elements or steps, and that terms such as "one" do not exclude a multiplicity of the latter. It should furthermore be noted that features or steps described with reference to one of the above examples of embodiment can also be used in combination with other features or steps of other examples of embodiment as described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SYMBOLS

1, 1' Cable-processing machine of a first type
2, 2' Cable-processing machine of a second type
3, 3', 3", 3''' Local database of a cable-processing machine
4 Control server
5, 5', 5" Switching device
6 Central database
7 Software of the control server
8 Stationary terminal device
9 Mobile terminal device
10 Monitoring system
20 Simple user
21 User with special rights
30, 30', 30" Communication between cable-processing machine and control server
31 Communication between control server and stationary terminal device
32 Push message

What is claimed is:

1. A computer-implemented method for monitoring a plurality of cable-processing machines for processing of cables, the method comprising the following steps:

transmission of production parameters from at least one cable-processing machine of the plurality of cable-processing machines to a control server with a central database, wherein the production parameters include settings for the at least one cable-processing machine, where the settings include speed and acceleration of cable feed, cutting depth of knives during stripping of insulation, and process settings on crimping modules, and the control server is adapted for data communication with each of the cable-processing machines;

reception of the production parameters by the control server;

storage of the production parameters in the central database by the control server; and providing a web service by the control server, wherein the web service is adapted for representation of configurations of the cable-processing machines and definition of groups of the cable-processing machines, including comparison of the production parameters of the cable processing machines in a group and causing the control server to transmit same ones of the production parameters to the cable processing machines in a group.

2. The method according to claim 1 further comprising the following steps:

transmission of fault messages from the at one cable-processing machine to the control server;

reception of the fault messages by the control server; and storage of the fault messages in the central database by the control server.

3. The method according to claim 1 further comprising the following steps:

transmission of production data from the control server to the at least one cable-processing machine, wherein the production data includes at least one of a type of the cables to be processed, a number of the cables to be processed, and a batch size;

storage of the transmitted production data in the central database; and reception and processing of the transmitted production data by the at least one cable-processing machine.

4. The method according to claim 1 further comprising the following steps:

transmission of production data from the at least one cable-processing machine to the control server, wherein the production data includes at least one of a type of the cables to be processed, a number of the cables to be processed, and a batch size;

reception of the production data by the control server; and storage of the production data received by the control server in the central database.

5. The method according to claim 1 further comprising the following steps:

transmission of at least one of quality data and quality parameters from the at least one cable-processing machine to the control server, wherein the quality data includes information concerning a quality of cables processed by the at least one cable-processing machine and the quality parameters include settings for determining quality of the processed cables; and reception of the quality data and/or the quality parameters by the control server, and storage of the quality data and/or the quality parameters in the central database.

6. The method according to claim 1 further comprising the following steps:

transmission of at least one of log-on data and log-off data of users of the at least one cable-processing machine to the control server, wherein the log-on data and the log-off data include times of log-ons and log-offs respectively of the users; and storage of the log-on data and/or log-off data in the central database.

7. The method according to claim 1 further comprising the following step: transmission of at least one of a fault message and a warning message from the control server to a terminal device accessible by a user of the at least one cable-processing machine wherein the user has special rights on the at least one cable-processing machine.

8. The method according to claim 1 wherein:

the plurality of cable-processing machines includes mutually different types of the cable-processing machines;

the cable-processing machines of the same one of the types are assembled into a group; and the control server transmits same ones of the production parameters to each of the cable-processing machines in at least one of the assembled groups.

9. The method according to claim 1 wherein:

each of the cable-processing machines has an associated local database in which associated ones of the production parameters are stored; and the production parameters are exchanged between the cable-processing machines and the control server such that the central database stores a copy of the production parameters from each of the local databases.

10. The method according to claim 1 further comprising the following steps:

transmission of at least one of cable-processing start times and cable-processing end times of production batches of the at least one cable-processing machine to the control server;

reception of the cable-processing start times and/or the cable-processing end times by the control server; and storage of the cable-processing start times and/or the cable-processing end times in the central database.

11. The method according to claim 1 further comprising the following steps:

transmission of the production parameters from the control server to the at least one cable-processing machine;

reception and adoption of the production parameters by the at least one cable-processing machine; and storage of the transmitted production parameters in the central database.

12. The method according to claim 1 wherein the web service is further adapted for:

management of users of the cable-processing machines including a user level;

representation and/or alteration of production data of the cable-processing machines and/or distribution of article definitions from the control server to the cable-processing machines;

representation and/or comparison of the production parameters of a specific group of the cable-processing machines;

definition and storage of rules for representation, comparison, filtering and/or synchronization of data available in the central database;

statistical evaluation of production data, the production parameters, other data and/or fault messages in the central database; and/or definition of events and/or data deviations that generate a fault message and/or a warning message.

13. A computer program product comprising instructions readable by a computer processor that, when executed by the processor, cause the processor to execute the method according to claim 1.

14. A non-transitory computer-readable medium on which is stored the computer program product according to claim 13.

15. A monitoring system for monitoring cable-processing machines comprising:

a plurality of cable-processing machines for processing cables; and a control server for controlling and monitoring the cable-processing machines, wherein, the control server includes a central database, the cable-processing machines transmit associated production parameters to the control server, the production parameters include settings for each of the cable-processing machines for the processing of the cables, where the settings include speed and acceleration of cable feed, cutting depth of knives during stripping of insulation, and process settings on crimping modules, the control server receives the production parameters and stores the production parameters in the central database, and the control server provides a web service, wherein the web service is adapted for representation of configurations of the cable-processing machines and definition of groups of the cable-processing machines, including comparison of the production parameters of the cable processing machines in a group and causing the control server to transmit same ones of the production parameters to the cable processing machines in a group.

16. The monitoring system according to claim 15 wherein the cable-processing machines transmit associated fault messages to the control server, and wherein the control server receives the fault messages and stores the fault messages in the central database.

17. The monitoring system according to claim 15 wherein the cable-processing machines transmit associated quality data and/or associated quality parameters to the control server, wherein the quality data includes information concerning a quality of cables processed by the cable-processing machines, and wherein the quality parameters include settings for determining a quality of the processed cables; and wherein the control server receives the quality data and/or the quality parameters, and stores the quality data and/or the quality parameters in the central database.

18. The monitoring system according to claim 15 wherein each of the cable-processing machines includes a local database, and wherein the central database stores a copy of data in each of the local databases.

19. The monitoring system according to claim 15 including at least one terminal device being a stationary terminal device or a mobile terminal device, and wherein the control server transmits to the at least one terminal device fault messages and/or statistics based on quality data of cables processed by the cable-processing machines.

20. The monitoring system according to claim 15 wherein the web service is further adapted for:

management of users of the cable-processing machines including user levels;

representation and/or alteration of production data of the cable-processing machines and/or distribution of article definitions from the control server to the cable-processing machines;

representation and/or comparison of the production parameters of a specific group of the cable-processing machines;

definition and storage of rules for representation, comparison, filtering and/or synchronization of data available in the central database;

statistical evaluation of the production data, the production parameters, other data, and/or fault messages in the central database; and/or definition of events and/or data deviations that generate a fault message and/or a warning message.

* * * * *